(12) United States Patent
Pothoff et al.

(10) Patent No.: US 10,565,070 B2
(45) Date of Patent: Feb. 18, 2020

(54) SYSTEMS AND METHODS FOR RECOVERY OF CONSISTENT DATABASE INDEXES

(71) Applicant: BMC Software, Inc., Houston, TX (US)

(72) Inventors: William J. Pothoff, Austin, TX (US); Thomas G. Price, Austin, TX (US); Vladimir Prasolov, Tel Hai (IL)

(73) Assignee: BMC Software, Inc., Houston, TX (US)

(*) Notice: Subject to any disclaimer, the term of this patent is extended or adjusted under 35 U.S.C. 154(b) by 213 days.

(21) Appl. No.: 15/826,192

(22) Filed: Nov. 29, 2017

(65) Prior Publication Data

US 2019/0163579 A1 May 30, 2019

(51) Int. Cl.
*G06F 16/00* (2019.01)
*G06F 11/14* (2006.01)
*G06F 7/08* (2006.01)
*G06F 16/23* (2019.01)

(52) U.S. Cl.
CPC ............ *G06F 11/1469* (2013.01); *G06F 7/08* (2013.01); *G06F 11/1451* (2013.01); *G06F 16/2379* (2019.01); *G06F 2201/84* (2013.01)

(58) Field of Classification Search
CPC ............ G06F 11/1451; G06F 11/1469; G06F 16/2365; G06F 16/2379; G06F 2201/84; G06F 7/08
See application file for complete search history.

(56) References Cited

U.S. PATENT DOCUMENTS

| | | | | |
|---|---|---|---|---|
| 5,455,944 A | * | 10/1995 | Haderle | G06F 9/466 |
| 6,631,366 B1 | * | 10/2003 | Nagavamsi | G06F 16/2455 |
| | | | | 707/741 |
| 2004/0122842 A1 | * | 6/2004 | Friske | G06F 16/2358 |
| 2015/0186444 A1 | * | 7/2015 | Andrei | G06F 11/1448 |
| | | | | 707/649 |

* cited by examiner

*Primary Examiner* — Cheryl Lewis
(74) *Attorney, Agent, or Firm* — Brake Hughes Bellermann LLP

(57) ABSTRACT

A method to efficiently create a consistent image of a database index at any point-in-time by reversing the effect of uncommitted updates by applying database transaction logs to an index page set in a single pass. The created image can be used to recover the database index to a point in time that is consistent with its associated table, or for physical migration where data and indexes are migrated to another database that may or may not be on the same DBMS and the indexes and data must be consistent as of the same point in time.

30 Claims, 12 Drawing Sheets

200 | (continued)

---

Sequentially processing all pages in an image copy of the index, applying sorted log records one page at a time to recover the index as follows > Reading a page of the index from the image copy 261
>
> Applying the sorted log records to the index page 262
>> If a log record is for an uncommitted key/RID insert, applying the log record to the index page by inserting the key/RID (because, in the case of a non-unique index, other transactions may add RIDs to the RID list for the key), and then marking the inserted RID as being deleted by setting the pseudo-del indicator that is associated with the inserted RID 262a
>>
>> If a log record is for an uncommitted delete of a RID, or an insert of an additional RID to an existing key, bypassing application of the log record to the index page 262b
>>
>> Applying other log records normally to the index page 262c

~260

If the index page was updated by a log record that re-introduces index data from an uncommitted transaction (i.e., page split, garbage collection, etc.) and if the log point of that log record is in the range of log containing uncommitted transactions for the index, post processing the index page 263

> Examining all key/RID pairs on the index page to determine if any of the index entries were affected by uncommitted log records, and reversing the effect of the uncommitted updates using the key/RID data that was previously stored 263a
>
>> if the first uncommitted update to a key/RID pair was an insert (at 262a) with the RID marked as being uncommitted, setting the pseudo-delete indicator to delete to restore the last committed state for the key 263aa
>>
>> if the first uncommitted update to a key/RID pair was a delete, removing the pseudo-delete indicator marking the RID as being deleted to reverse the effect of the delete and to get the last committed state for that key 263ab Writing the updated index page to the index 264

FIG. 2 (continued)

| LRSN | Index Page # | Action | Key | RID | URID |
|---|---|---|---|---|---|
| 1111 | 15 | Insert (key and RID) | ABC1 | 12301 | 1000 |
| 1112 | 15 | Insert (key and RID) | ABC2 | 12302 | 1000 |
| 1113 | 15 | Insert (key and RID) | ABC3 | 12303 | 1000 |
| 1114 | | COMMIT (end URID) | | | 1000 |
| 1115 | | Make backup copy | | | |
| 1120 | 15 | Delete | ABC2 | 12302 | 1010 ** |
| 1131 | 15 | Insert (key and RID) | ABC4 | 12304 | 1030 |
| 1132 | 15 | Insert (key and RID) | ABC5 | 12305 | 1030 |
| 1133 | 15 | Insert (key and RID) | ABC6 | 12306 | 1030 |
| 1134 | | COMMIT (end URID) | | | 1030 |
| 1141 | 15 | Delete | ABC5 | 12305 | 1040 ** |
| 1142 | 14 | SPLIT page 15 (keys ABC4-ABC6 move to page 14 / Rewrite page 14 with keys ABC4-ABC6). | | | 1040 ** |
| 1143 | 15 | SPLIT page 15 (keys ABC4-ABC6 move to page 14 / Rewrite page 15 with keys ABC1-ABC3). | | | 1040 ** |
| 1144 | 14 | Insert (key and RID) | ABC7 | 12307 | 1040 ** |
| 1145 | 14 | Insert (add RID) | ABC7 | 12308 | 1041 |
| 1146 | | COMMIT (end URID) | | | 1041 |
| 1147 | | RECOVERY POINT | | | |
| 1148 | | COMMIT (end URID) | | | 1040 ** |
| 1149 | | COMMIT (end URID) | | | 1010 ** |

\*\* - uncommitted transactions

Sample Transaction Log 300

FIG. 3

Backup Index Copy Contents:

Page 14 contents (empty page / free space):

| Key | RID /Pseudo Del |
|-----|-----------------|
|     |                 |
|     |                 |
|     |                 |

Page 15 contents:

| Key  | RID /Pseudo Del |
|------|-----------------|
| ABC1 | 12301           |
| ABC2 | 12302           |
| ABC3 | 12303           |

Sample Backup Index Copy 400

FIG. 4

| LRSN | Action | Key | RID |
|------|--------|------|-------|
| 1120 | Delete | ABC2 | 12302 |
| 1141 | Delete | ABC5 | 12305 |
| 1144 | Insert | ABC7 | 12307 |

Stored data 500
(for the log records that are associated with uncommitted URIDs)

FIG. 5

| LRSN | Index Page # | Action | Key | RID | URID |
|---|---|---|---|---|---|
| 1142 | 14 | SPLIT page 15 (keys ABC4-ABC6 move to page 14 / Rewrite page 14 with keys ABC4-ABC6). | | | 1040 ** |
| 1144 | 14 | Insert (key and RID) | ABC7 | 12307 | 1040 ** |
| 1145 | 14 | Insert (add RID) | ABC7 | 12308 | 1041 |
| 1120 | 15 | Delete | ABC2 | 12302 | 1010 ** |
| 1131 | 15 | Insert (key and RID) | ABC4 | 12304 | 1030 |
| 1132 | 15 | Insert (key and RID) | ABC5 | 12305 | 1030 |
| 1133 | 15 | Insert (key and RID) | ABC6 | 12306 | 1030 |
| 1141 | 15 | Delete | ABC5 | 12305 | 1040 ** |
| 1143 | 15 | SPLIT page 15 (keys ABC4-ABC6 move to page 14 / Rewrite page 15 with keys ABC1-ABC3). | | | 1040 ** |
| 1146 | | COMMIT (end URID) | | | 1041 |

Sorted log records 600

FIG. 6

Page 14 contents:

| Key  | RID /Pseudo Del |
|------|-----------------|
| ABC4 | 12304           |
| ABC5 | 12305           |
| ABC6 | 12306           |

FIG. 7A

Page 14 contents:

| Key  | RID /Pseudo Del? |
|------|------------------|
| ABC4 | 12304            |
| ABC5 | 12305            |
| ABC6 | 12306            |
| *ABC7* | *12307 (pd)*   |

FIG. 7B

Page 14 contents:

| Key  | RID /Pseudo Del? |
|------|------------------|
| ABC4 | 12304            |
| ABC5 | 12305            |
| ABC6 | 12306            |
| *ABC7* | 12307 (pd), *12308* |

FIG. 7C

Page 14 contents:

| Key  | RID /Pseudo Del? |
|------|------------------|
| ABC4 | 12304            |
| ABC5 | 12305 *(pd)*     |
| ABC6 | 12306            |
| ABC7 | 12307 (pd), 12308 |

FIG. 7D

Page 15 contents:

| Key | RID /Pseudo Del |
|-----|-----------------|
| ABC1 | 12301 |
| ABC2 | 12302 |
| ABC3 | 12303 |

FIG. 8A

Page 15 contents:

| Key | RID /Pseudo Del |
|-----|-----------------|
| ABC1 | 12301 |
| ABC2 | 12302 |
| ABC3 | 12303 |
| ABC4 | 12304 |
| ABC5 | 12305 |
| ABC6 | 12306 |

FIG. 8B

Page 15 contents (entire page is rewritten by page split log record):

| Key | RID /Pseudo Del |
|-----|-----------------|
| *ABC1* | *12301* |
| *ABC2* | *12302 (pd)* |
| *ABC3* | *12303* |

FIG. 8C

Page 15 contents:

| Key | RID /Pseudo Del |
|-----|-----------------|
| ABC1 | 12301 |
| ABC2 | 12302 ~~(pd)~~ |
| ABC3 | 12303 |

FIG. 8D

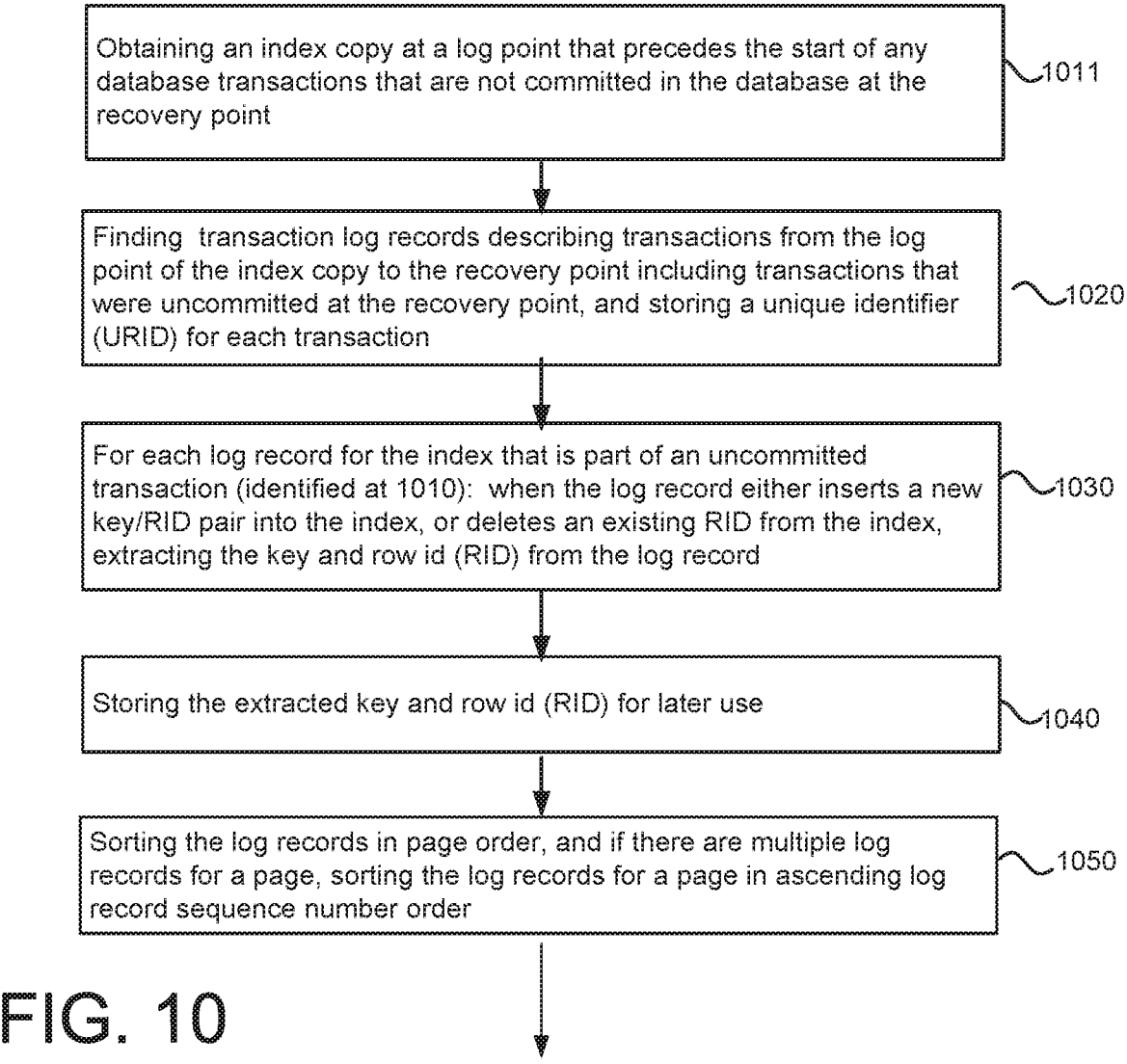

1000 (continued)

```
Sequentially processing all pages in an image copy of the index, applying sorted
log records one page at a time to recover the index as follows
    Reading a page of the index from the image copy 1061
    Applying the sorted log records to the index page 1062                    ⎫
        If a log record is for an uncommitted key/RID insert, applying the log │
        record to the index page by inserting the key/RID (because, in the case of │
        a non-unique index, other transactions may add RIDs to the RID list for │
        the key), and then marking the inserted RID as being deleted by setting │
        the pseudo-del indicator that is associated with the inserted RID  1062a│
                                                                                │ 1060
        If a log record is for an uncommitted delete of a RID, or an insert of an│
        additional RID to an existing key, bypassing application of the log record│
        to the index page 1062b                                                  │
                                                                                 │
        Applying other log records normally to the index page 1062c              │
                                                                                 │
    If the index page was updated by a log record that re-introduces index data  │
    from an uncommitted transaction (i.e., page split, garbage collection, etc.) and if│
    the log point of that log record is in the range of log containing uncommitted│
    transactions for the index, post processing the index page 1063              │
        Examining all key/RID pairs on the index page to determine if any of the │
        index entries were affected by uncommitted log records, and reversing    │
        the effect of the uncommitted updates using the key/RID data that was    │
        previously stored 1063a                                                  │
            if the first uncommitted update to a key/RID pair was an insert (at  │
            10610a) with the RID marked as being uncommitted, setting the        │
            pseudo-delete indicator to delete to restore the last committed      │
            state for the key 1063aa                                             │
            if the first uncommitted update to a key/RID pair was a delete,      │
            removing the pseudo-delete indicator marking the RID as being        │
            deleted to reverse the effect of the delete and to get the last      │
            committed state for that key 1063ab                                  │
    Writing the updated index page to the index copy 1064                        ⎭
```

FIG. 10(continued)

SYSTEMS AND METHODS FOR RECOVERY OF CONSISTENT DATABASE INDEXES

This description relates to the operation and maintenance of databases.

BACKGROUND

A database is an organized collection of data (e.g., a collection of schemas, tables, queries, reports, views, and other objects). The database may be hosted on a single computer storage medium (e.g., disks, semiconductor memory, etc.) or can be hosted in a distributed manner on several computer storage media (e.g., on a network of computers). A database-management system (DBMS) is a computer-software application that interacts with end-users, other applications, and the database itself to capture and analyze data. The terms "database" and "database management system" are often used interchangeably.

In typical computer system operations, a database can be a dynamic entity that may be available at all times for transactions with data records in the database being updated (e.g., inserted, deleted or revised, etc.) or being accessed round the clock. A database "transaction" is sequence of operations (e.g., insertions, deletions or revisions, etc.) performed as a single logical unit of work within the DBMS against the database. An "uncommitted" or "in-flight" transaction is a transaction in which the entire sequence of operations has not been completed. In example use cases, large quantities of data can be stored and maintained in the database. Preventing data loss is one of the most critical issues involved in managing database systems. Data can be lost as a result of many different failures (e.g., hardware failures, viruses, user errors in updating or deleting data, software bugs, fire or flood, etc.).

Strategies for recovery of the database after data loss or failure may include strategies based, for example, on full backups, differential backups, and transaction logs backups. The full backups strategy is to back up the whole database periodically (e.g., once each night). A full database backup contains all data and database meta information needed to restore the whole database. A differential backup stores only the data changes that have occurred since the last full database backup (e.g., since last night). With the full backups or differential backups strategies, it may be possible to recover a database to the state it had when the last backup occurred. A transaction log may be used to recreate or recover the database from the last backup up to the last completed transaction that took place before the failure occurred.

A database index is a data structure that improves the speed of data retrieval operations on a database table at the cost of additional writes and storage space to maintain the index data structure. Indexes are used to quickly locate data without having to search, for example, every row in a database table every time the database table is accessed. Indexes can be created using one or more columns of a database table, providing the basis for both rapid random lookups and efficient access of ordered records.

Recovering a table in a database to a prior point-in-time typically requires that the indexes on that table are recovered to a point that is consistent with the table.

Consideration is now being given to recovery of a database index consistent with the recovery of a database to a prior point-in-time when there are uncommitted (i.e., in-flight transactions) at that point-in-time.

SUMMARY

Systems and methods, which are described herein, recover a consistent database index to reference, at a recovery point-in-time, data records that are contained in a database recovered from a backup copy or a migration copy of the database. The data records are identified by a record identifier (RID) and the index includes one or more index pages with (key/RID) pair entries.

In a general aspect, a method includes obtaining an index copy at a log point-in-time that precedes database transactions on the database that were uncommitted at the recovery point, and finding transaction log records describing transactions from the log point to the recovery point including both log records describing transactions that were committed and log records describing transactions that were uncommitted at the recovery point.

The method further includes sorting the log records in an index page order and an ascending log record sequence number (LRSN) order, and applying, in sorted page order and LRSN order, the updates reflected in the sorted log records to the pages of the index copy in a single pass operation on the index copy.

In a further aspect, applying the updates reflected in the sorted log records to the pages of the index copy includes marking the RID from each key/RID entry caused by an uncommitted insert as a deleted RID. The method further involves, after or during the single pass operation, restoring each key/RID entry that is a result of an uncommitted transaction to its last committed state by deleting the RIDs that were added by an uncommitted insert and un-deleting each RID entry caused by an uncommitted delete. The method restores each key/RID entry in the index to a state that is consistent with the database in that only updates that were committed at the recovery point are reflected in the recovered index.

The details of one or more implementations are set forth in the accompanying drawings and the description below. Other features will be apparent from the description and drawings, and from the claims.

BRIEF DESCRIPTION OF THE DRAWINGS

FIG. 3 is an illustration of a sample transaction log of a database, in accordance with the principles of the present disclosure.

FIG. 4 is an illustration of a set of pages of a sample backup index copy made at a database backup time, in accordance with the principles of the present disclosure.

FIG. 5 is an illustration of stored data of the log records that are associated with uncommitted unit of recovery identifiers (URIDs) in the sample transaction log 300 of FIG. 3, in accordance with the principles of the present disclosure.

FIG. 6 is an illustration of log records of the sample transaction log of FIG. 3, first sorted in page order and then in LRSN order, in accordance with the principles of the present disclosure.

FIGS. 7A-7D are illustrations of index page content after sequential application of log records in the sample transaction log of FIG. 3 for an initially empty page, in accordance with the principles of the present disclosure.

FIGS. 8A-8D are illustrations of index page content after sequential application of log records in the sample transaction log of FIG. 3 for a page, in accordance with the principles of the present disclosure.

FIG. 10 is an illustration of an example method for making a consistent index copy at a specified point-in-time, in accordance with the principles of the present disclosure.

DETAILED DESCRIPTION

Figure 1:
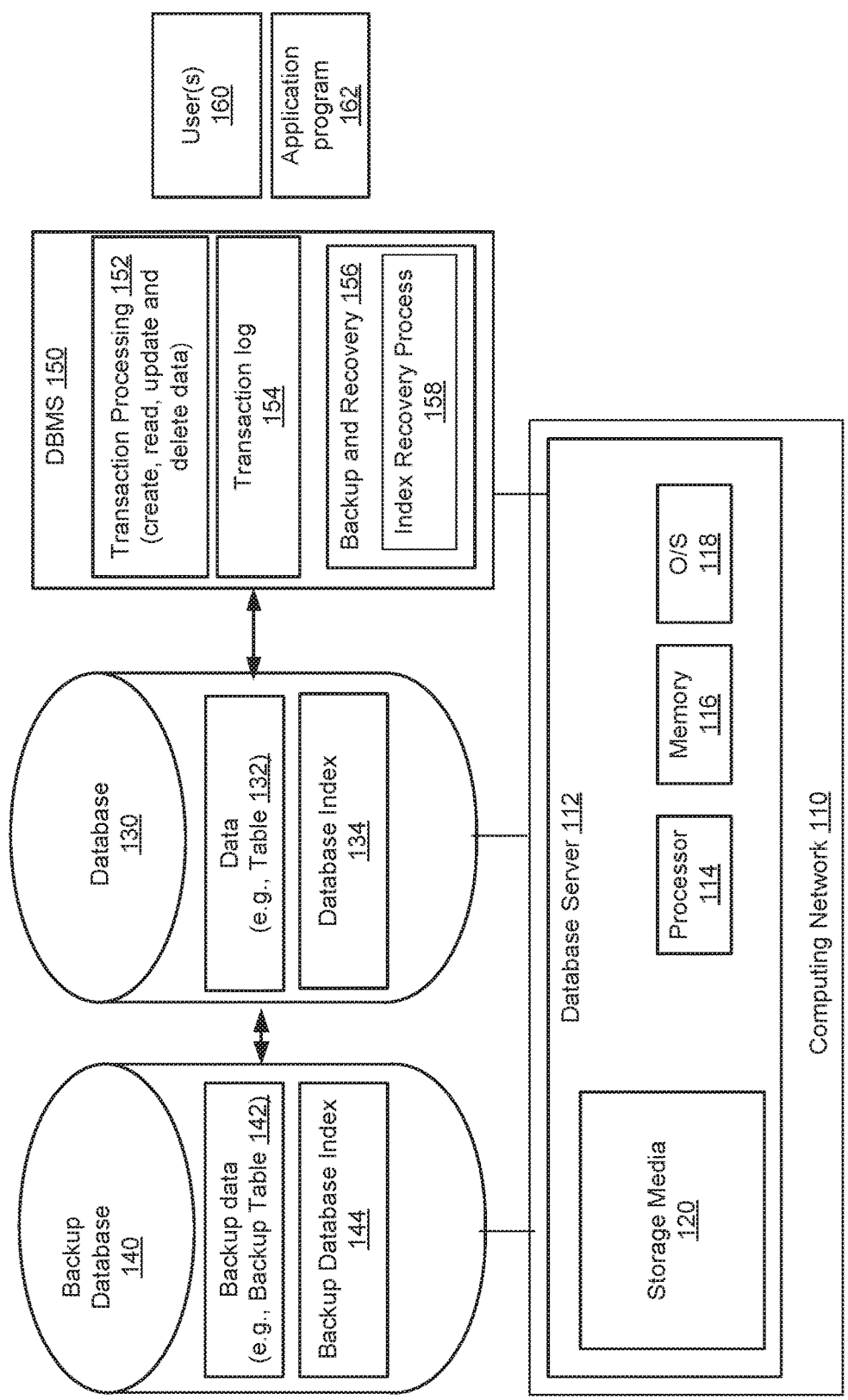
FIG. 1 is a schematic block diagram illustration of an example database environment, in accordance with the principles of the present disclosure.

The content (i.e., data records) of a database can be in state of flux because ongoing database transactions can add, delete, update, or modify the data records stored in the database. A database index is "consistent" with the database at a point-in-time if it references only the data records that are assured to be present in the database as a result of database transactions completed by the point-in-time. Database record entries that are a result of uncompleted ongoing database transactions may not be present in the database if the uncompleted ongoing database transactions are not fully executed by the point-in-time.

A consistent index at a point-in-time can be obtained by applying intervening transactions to a prior index copy obtained at a prior time.

In accordance with the principles of the present disclosure, to obtain the consistent index from the prior index copy, a transactions log with log records of intervening transactions is sorted by index page number and log record sequence number. Index key and database record identifiers data for uncommitted intervening transactions is extracted and stored. The sorted intervening transactions including both committed and uncommitted transactions are applied to pages of the prior consistent index in page and time sequence in a single pass operation. The effect of the uncommitted transactions on the marked data entries is reversed or removed during the single pass operation to restore these entries to their prior committed state, and thereby obtain the consistent index that references only the data records that are committed to be present in the database at the point-in-time.

The disclosed systems and methods herein can be used to recover a database index consistent with the recovery of the database to a point-in-time.

The database may include data structured, for example, as one or more tables. Each row of a table in the database may be referred to as a database "record." A database index (hereinafter "index") may be made up of one or more index pages that contain ordered keys and pointers to the data rows of an associated table in the database. These pointers are known as row identifiers or RIDs. The index pages, which may be uniquely identified by respective page numbers, are typically about 4 KB in size. Each operation (i.e., transaction) that changes or alters data in the database may be recorded or logged in time as a "log record" in a transactions log for the database.

The following terminology may be used in the description of the recovery of database indexes herein:

Terminology

Transaction—a sequence of operations (i.e., updates such as insertions, deletions or revisions, etc.) performed as a single logical unit of work within the DBMS against the database.

Uncommitted or in-flight transaction—a transaction in which the entire sequence of operations or updates in the single logical unit of work has not been completed. An uncommitted or in-flight update is an update that is part of the uncommitted or in-flight transaction.

Log record sequence number (LRSN)—Unique identifier of a log record in the transactions log of the database.

Recovery point—a point-in-time (PIT) to which the index is to be recovered to properly reference data in the database. A recovery point may be expressed as a log point, or a LRSN.

Record Identifier (RID)—Unique identifier of a row in the table that is associated with a key in the index. In other words, the index is a list of (key, RID) pairs.

Unit of recovery identifier (URID)—A unique identifier of a database transaction (which is logged in the transactions log record).

Committed URID—A database transaction that has been completed.

Uncommitted URID—Also known as an "in-flight" transaction. This is a URID that was not completed (i.e., committed) prior to the recovery point.

Index Page—A fixed amount of index data (typically 4 KB) that is uniquely identified by its page number in the index.

Unique index—An index that has only one RID per index key.

Non-unique index—An index that has one to many RIDs per index key.

Pseudo-delete indicator—A deleted/not deleted status indicator (e.g., a bit, a flag, a notation, a marker, etc.) attached to entries (e.g., RIDs) in an index copy. The pseudo-delete indicator, which is associated with a RID pointer, may have two settings (e.g., delete and not deleted). The pseudo-delete indicator may, for example, be set to delete (e.g., 1 or other value such as "pd") to indicate that a RID resulting from uncommitted insert in the index copy is deleted. Conversely, the pseudo-delete indicator may, for example, be unset (e.g., to 0) to indicate that a RID that is subject to an uncommitted delete is not deleted, but is retained.

The systems and methods for recovery of database indexes, in accordance with the principles of the disclosure herein, involve recovering a database index from a backup to a point-in-time that may have uncommitted updates (transactions), and making the recovered database index at the point-in-time consistent with the recovered database by reversing the effect of uncommitted updates (transactions) in the recovered database index. FIG. 1 is a schematic block diagram illustration of an example database environment 100 in which the described systems and methods can be used to recover a database index of a database consistent with the recovery of the database to a prior point-in-time.

Example database environment 100 may, for example, include one or more databases (e.g., database 130) and an associated database management system (e.g., DBMS 150) hosted on a computing network 110. Computing network 110 may include one or more servers (e.g., database server 112). Database server 112 may, for example, include a processor (e.g., processor 114, a memory 116, and an operating system (O/S 118). Further, database server 110 may include (or be coupled to) storage media (e.g., storage media 120) including one or more of hard disks, in-memory storage, etc.

Although computing network 110 is shown in the example of FIG. 1 as including a single computing device (e.g., database server 112), it may be understood that computing network 110 may represent two or more computing devices in communication with one another. Computing network 110 shown in FIG. 1 may be understood to represent a set of physical electronic devices (such as computers (together with associated I/O devices like disk drives), storage devices, I/O channels, electromechanical devices that make interface between computers and the real world systems, etc.) in communication with one another. It will also be appreciated that any two or more components of computing network 110 may similarly be executed using some or all of the two or more computing devices in communication with one another. Conversely, it also may be appreciated that various components illustrated as being external to computing network 110 may actually be implemented therewith.

In example implementations, database 130 may include any data (e.g., table 132). Database 130 may contain both actual (or operational) data and metadata (data about data or description about data). In the example shown in FIG. 1, database 130 includes table 132 and also includes a database index (e.g., index 134) of table 132.

Users or administrators (e.g., user 160, application program 162, etc.) may use queries or programs (e.g., on conventional or online workstations or terminals) to access database 130 via DBMS 150. Each query or program may contain statements that request DBMS 150 to perform operations or transactions involving data (i.e., records in table 132) in database 130. The operations or transactions may, for example, include retrieving, updating, or deleting data, etc.

DBMS 150 may include a module (e.g., transactions processing module 152) with functions to carry out the requested operations or transactions (e.g., create, read, update and delete) on the records in table 132. Further, DBMS 150 may maintain a transaction log (e.g., transaction log 154) of log records of the requested operations or transactions in a time sequence. An operation or transaction may be identified in transaction log 154 by its LRSN.

DBMS 150 may further include dynamic completion information in the log record in transaction log 154 for each of the requested operations or transactions. The log record for an operation or transaction may, for example, indicate whether the operation or transaction is committed (i.e., has been completed) or is uncommitted (i.e., is in process or "in flight" awaiting completion).

DBMS 150 may further include a module (e.g., backup and recovery module 156) which includes processes for making a copy of database 130, for example, for data backup, migration, or replication. Backing up data is vital for organizations using database 130 to overcome data loss (which can occur for a variety of causes including, for example, hardware failure, incorrect or invalid data, human error, computer virus, natural disasters, etc.). In example implementations, DBMS 150 may provide periodic backups of the entire database or a subset of the database (e.g., at least once per day). In full backups all selected data is backed up. Incremental backups record changes made since the last backup. Differential backups record changes made since the last full backup.

FIG. 1 shows, for example, backup database 140, which may be a copy of database 130 made by DBMS 150 at a particular point-in-time (e.g., a scheduled daily time for backups). Backup database 140 includes, for example, backup table 142 as a copy of table 132, and backup database index 144 as a copy of database index 134. Backup database 140 may be time stamped to indicate the time of copy. In case of a crash or failure of database 130, backup database 140 may be used by DBMS 140 as a starting point to recover database 130 to a time just before the crash or failure. Recovery of database 130 to a time (e.g., a "prior point-in-time") before the crash or failure may involve re-running or re-executing transactions (identified from the transaction log 154) on backup database 140 up to prior point-in-time.

However, to fully restore or recover database 130 at prior point-in-time to have same functionality as before (before the crash or failure) typically requires that the indexes (e.g., database index 134) on the data (e.g., table 132) in database 130 are also recovered to a point that is consistent with the data (e.g., table 132). Traditional approaches to recovery of a database index (e.g., database index 134) involve either rebuilding the index based on row data in the table after the table has been recovered, or recovering the index and table to a point-in-time ("recovery point") at which no transactions on (or updates to) the table were occurring.

Nether of the two traditional approaches are satisfactory in most instances. Since data (e.g., table 132) in database 130 may not be available for use until the indexes have been made consistent with the data, index rebuild (based on row data in the table after the table has been recovered), under the first approach, can significantly extend the database outage that is associated with recovery. Further, finding a suitable recovery point at which no updates to the database were occurring, under the second approach, can be difficult or impossible in many cases, so index recovery may not be possible.

In example implementations, backup and recovery module 156 may include an index recovery process 158 that recovers a consistent index from a backup index copy (e.g., backup database index 144), in accordance with the principles of the present disclosure. The backup index copy may include uncommitted updates. Index recovery process 158 makes the recovered index consistent with the recovered database at a point-in-time (recovery point) by reversing the effect of the uncommitted updates from the recovered index, in accordance with the principles of the present disclosure.

To facilitate implementation of index recovery process 158, backup processes (of backup and recovery 156) for making a backup index copy (e.g., backup database index 144) may be configured to identify or record a log point that precedes any updates (transactions) that are not included in the backup index copy. The log point may be identified as a relative byte address (RBA) or log record sequence number (LRSN) that precedes any updates (transactions) that are not included in the backup index copy.

Figure 2:
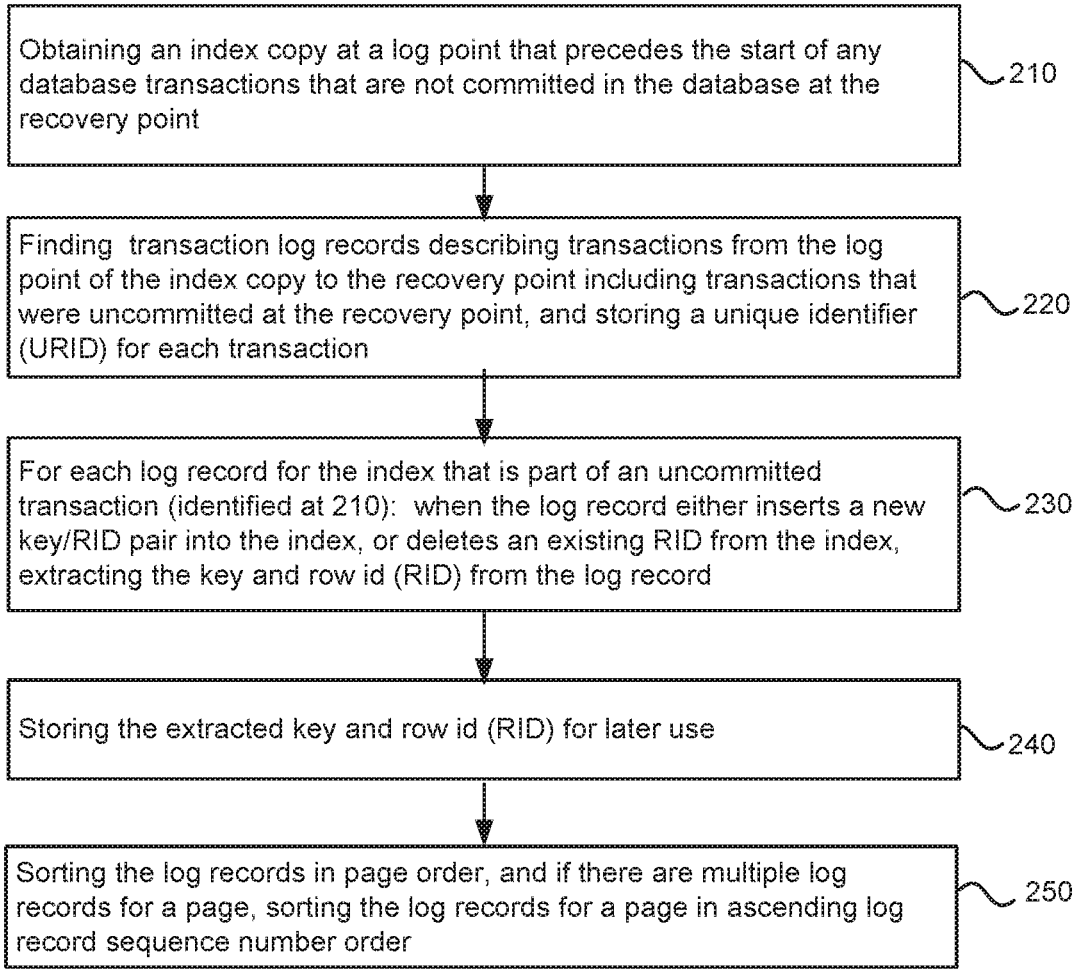
FIG. 2 is an illustration of a method for recovering a database index that is consistent with a recovered database at a recovery point, in accordance with the principles of the present disclosure.

FIG. 2 shows an example method 200, which may be used by index recovery process 158, to recover an index that is consistent with the recovered database at a recovery point, in accordance with the principles of the present disclosure.

Method 200 includes obtaining an index copy at a log point that precedes the start of any database transactions that are not committed in the database at the recovery point (210), and finding transaction log records describing transactions from the log point of the index copy to the recovery point including transactions that were uncommitted at the recovery point, and storing a unique identifier (URID) for each transaction (220). Each transaction (e.g., in DB2 for z/OS) may be identified by a unit of recovery id (URID).

Method 200 further includes, for each log record for the index that is part of an uncommitted transaction (identified at 210): when the log record either inserts a new RID into the index, or deletes an existing RID from the index, extracting the key and row id (RID) from the log record (230), and storing the extracted key and row id (RID) for later use (240) (e.g., to later reverse the effects of the uncommitted transactions).

The extracted key and row id (RID) may be used later to restore the key/RID pair to the last committed state. Since only the first uncommitted log record for a key/RID pair is required in order to be able to restore the key to the last committed state, storing only the first uncommitted update to a key/RID pair may be adequate.

Method 200 further includes sorting the log records in index page order, and if there are multiple log records for a page, sorting the log records for the page in ascending log record sequence number order (250).

Method 200 then involves sequentially processing all pages in an image copy (e.g., a backup copy) of the index, one page at a time, to recover the index (260). Sequentially processing pages in the image copy 260 includes reading a page of the index from the image copy (261) and applying the sorted log records to the index page (262).

If a log record is for an uncommitted key/RID insert, applying the sorted log records to the index page 262 includes inserting the key/RID in the index page (because, in the case of a non-unique index, other transactions may add RIDs to the RID list for the key), and then marking the inserted RID as being a deleted RID by setting a pseudo-delete indicator associated with the RID (262*a*).

Conversely, if a log record is for an uncommitted delete of a RID, or an insert of an additional RID to an existing key, in a first implementation of method 200, applying the sorted log records to the index page 262 may include bypassing application of the log record (for the uncommitted delete, or for the insert of an additional RID to an existing key) to the index page (262*b*). In a second implementation of method 200, applying the sorted log records to the index page 262 includes applying the log record to the index page by setting the pseudo-delete indicator for the RID that is deleted, or adding the RID that is inserted. After the log record is applied, the pseudo-delete indicator can be removed to reverse the effect of the uncommitted delete, or can be set to reverse the effect of the uncommitted insert to achieve the same effect as the first implementation of method 200 (i.e., keeping the uncommitted delete RID, or not adding the RID from the uncommitted insert).

Applying the sorted log records to the index page 262 includes applying other log records (other than the uncommitted key/RID insert, uncommitted RID delete, and uncommitted RID insert to existing key log records) normally to the index page (262*c*).

After all log records have been applied to the index page at 262, method 200 includes, if the index page was updated by a log record that re-introduces index data from an uncommitted transaction (i.e., page split, garbage collection, etc.) and if the log point of that log record is in the range of log containing uncommitted transactions for the index, post processing the index page (263).

In method 200, post processing the index page 263 includes determining if any uncommitted index updates were re-introduced by a log record that re-writes the page (such as a page split, or garbage collection) by comparing each key/RID pair entry in the index page with the key/RID data that was previously stored (e.g., at 240), and if any of the index entries were affected by uncommitted updates, reversing the effect of the uncommitted updates using the key/RID data that was previously stored (e.g., at 240) (263*a*).

Further, reversing the effect of the uncommitted updates using the key/RID data that was previously stored 263*a* includes, if the first uncommitted update to a key/RID pair was an insert, setting the pseudo-delete indicator to delete to restore the last committed state for the key (263*aa*), and, if the first uncommitted update to a key/RID pair was a delete, removing the pseudo-delete indicator marking the RID as being deleted to reverse the effect of the delete and to get the last committed state for that key (263*ab*).

Method 200 further includes writing the updated index page to the index (264).

After all pages have been sequentially processed at 260, an index that is consistent to the recovery point is recovered (i.e., an index in which each key/RID entry is restored to a state that is consistent with the associated table in that only changes or updates that were committed at the recovery point are reflected in the index).

It will be noted that in method 200, sequentially processing pages in an image copy to recover the index 260 removes in-flight transactions in a single pass of the index, without the need for separate rollback operations. This may be contrasted with traditional approaches to index recovery to a point-in-time that use rollback operations to remove in-flight transactions. The rollback in the traditional approaches generally requires random I/O to re-read index pages that were already processed. By avoiding rollback operations, index recovery process 158/method 200 can recover indexes faster even while using less CPU than the traditional approaches.

Example Index Recovery

In the following an example operation of index recovery process 158/method 200 for recovery of a non-unique index from a backup copy is described with reference to sample transaction logs and index pages shown in FIGS. 3 and 4.

FIG. 3 shows a sample transaction log 300 in which transactions are listed for a time period ranging from LRSN 1111 to LRSN 1149. LRSN 1115 is shown as the time a backup copy of the non-unique index was made. LRSN 1147 is selected as the recovery point for recovery of the non-unique index.

Sample transaction log 300 includes transaction information records in rows for each LRSN, for example, under the column headings LRSN, Index page #, Action, Key, RID and URID. As seen under the column heading URID, sample transaction log 300 includes information for transactions URID=1000, 1010, 1030, 1040, and 1041, at different LRSN. The information for these transactions includes information on the Index page #, Action, Key, and RID that are involved in the respective transactions.

It will be noted that not all transactions are committed at or before the recovery point (LRSN 1147). The uncommitted (i.e., in-flight transactions) (which are marked by double asterisks "" for visual reference in FIG. 3) include two URIDs i.e., 1010 and 1040, that are uncommitted at LRSN 1147. URID 1010, which was not committed, deleted Key/RID pair ABC2/12302 at LSRN 1120. URID 1040, which was not committed, deleted Key/RID pair ABC5/12305 at LSRN 1141, and inserted RID 12307 for Key ABC7 into the index at LSRN 1144. It will also be noted that Key ABC7 has 2 RIDs associated with it (i.e., RID 12307 and RID 12308). (URID 1040 was not committed at the recovery point, but uncommitted URID 1040 inserted a new Key ABC7 with RID 12307 into the index at LSRN 1144, and URID 1041, which was committed at the recovery point, added RID 12308 to Key ABC7 at LSRN 1145. In other words, a committed transaction (URID 1041) added a RID to key that was previously inserted by an uncommitted transaction (URID 1040**)).

FIG. 4 shows a sample backup index copy 400 that may have been made at LSRN 1115. Sample backup index copy 400 may include several pages. For visual clarity, only page 14 and page 15 are shown in the example of FIG. 4.

With reference to FIGS. 2, 3 and 4, the steps of method 200 as applied to recover a consistent index to LRSN 1147 from the sample backup index copy 400 made at LRSN 1115 may be as follows:

Step 1 (method 200 at 210)—Identify uncommitted URIDs in the transaction log (sample transaction log 300) with a result that the uncommitted URIDS are: 1010, 1040.

Step 2 (method 200 at 220-240)—Read the transaction log (sample transaction log 300) and extract records between the start of the backup copy (LRSN 1115) to the recovery point (LRSN 1147), and store data of the log records associated with the uncommitted URIDs. FIG. 5 shows, for example, stored data 500 of the log records that are associated with uncommitted URIDs in the sample transaction log 300 of FIG. 3.

Step 3 (method 200 at 250)—Sort log records in the transaction log (sample transaction log 300) in page order, and then LRSN order. FIG. 6 shows, for example, sorted log records 600 of the sample transaction log 300 of FIG. 3, first sorted in page order (page 14 and page 15) and then in LRSN order.

Step 4 (method 200 at 261 and 262)—Read pages from the backup index copy (e.g., page 14 and page 15 of sample backup index copy 400) and apply sorted log records (e.g., sorted log records 600) to the pages, one page at time in sequence. For example, sorted log records 600 may be first applied to page 14, and then (after page 14 is processed) applied to page 15.

Page 14

For page 14, which is an empty page, the log records (at LRSN 1142, 1144, and 1145) may be applied as follows:

1) LRSN 1142-Action: ("SPLIT page 15 (keys ABC4-ABC6 move to page 14). Rewrite page 14 with keys ABC4-ABC6") for uncommitted URID 1040. This action creates page 14, which was previously empty. The log record at LRSN 1142 is applied even though it is from an uncommitted URID (i.e., URID 1040), since other URIDs are dependent upon the presence of the data that will be placed there. Page 14 contents after this log record application at LSRN 1142 are shown, for example, in FIG. 7A.

2) LRSN 1144-Action: ("Insert (key and RID) ABC7/12307") for uncommitted URID 1040. The log record at LRSN 1142 is applied even though it is from an uncommitted URID (i.e., URID 1040) to insert key/RID pair=ABC7/12307 because subsequent inserts may add additional RIDs to this key. Because this is an uncommitted insert, the RID 12307 is marked pseudo-delete "pd". Page 14 contents after this log record application at LSRN 1144 are shown, for example, in FIG. 7B.

3) LRSN 1145-Action: ("Insert (add RID) ABC7/12308") for committed URID 1040. This Action adds a second RID 12308 to key ABC7 which already references pseudo-deleted RID 12307. Page 14 contents after this log record application at LSRN 1145 are shown, for example, in FIG. 7C.

By applying log records at LRSN 1142, 1144, and 1145, all log records for page 14 are processed at step 4 (method 200 at 261 and 262).

Since the full page 14 was re-written by a page split log record (at LSRN 1142), and the split occurred while there could have been uncommitted URIDs, page 14 is examined by index recovery process 158/method 200 to see if it contains index entries for uncommitted inserts or deletes by comparison with stored data 500 of the log records that are associated with uncommitted URIDs (stored at step 2 above, e.g., as stored data 500, FIG. 5). In this case, as shown in FIG. 7C, page 14 contains ABC5/12305, which was inserted into page 15 by an uncommitted URID (1041) before the page was split. Index recovery process 158/method 200 now marks this RID 12305 in page 14 as being pseudo deleted "pd." Page 14 contents after this marking are shown, for example, in FIG. 7D.

At this stage of index recovery process 158/method 200, index page 14 (as shown in 7D) is now consistent, in that it references only RIDs (i.e., 12304, 12306, and 12308) that were committed at recovery point LSRN.

Page 15

Page 15 as read from sample backup index copy 400 (method 200 at 261 and 262) is shown for example in FIG. 8A. After the log records have been applied to page 14 as discussed above, the log records (at LRSN 1120, 1131, 1132, 1133, 1141 1143) from sorted log records 600 of FIG. 6 (Step 3) may be applied to page 15 at Step 4 (method 200 at 261 and 262) as follows:

4) LRSN 1120—ACTION: ("Delete ABC2/12302") for uncommitted URID 1010. Recovery process 158/method 200 will not apply this log record to delete entry ABC2/12302 because the delete was not committed by the recovery point LRSN 1147. There is no change to the page 15 contents, which remain the same as shown in FIG. 8A.

5) The next three log records in sorted log records 600 of FIG. 6, i.e., LRSN 1131-ACTION: ("Insert (key and RID) ABC4/12304"); LRSN 1132-ACTION: ("Insert (key and RID) ABC5/12305"); and LRSN 1133-ACTION: ("Insert (key and RID) ABC6/12306"), are for committed URID 1030. Page 15 contents after application of these three log records are applied at LRSN 1131-1133, respectively, are shown, for example, in FIG. 8B.

6) LRSN 1141-ACTION: ("Delete ABC2/12302") for uncommitted URID 1040. Recovery process 158/method 200 will not apply this log record and not delete the entry ABC2/12302 because the delete was not committed by the recovery point LRSN 1147. There is no change to the page 15 contents, which remain the same as shown in FIG. 8B.

7) LRSN 1143-ACTION: ("SPLIT page 15 (keys ABC4-ABC6 move to page 14") for uncommitted URID 1040. Applying this log record causes a rewrite of page 15 with only keys ABC1-ABC3 remaining in the page. Page 15 contents after applying the log record at LRSN 1143 are shown, for example, in FIG. 8C. It will be noted that the key/RID pair entry ABC2/12302 was not deleted at LRSN 1141 above because it was not committed. The key/RID pair entry ABC2/12302 on page 15 (as shown in FIG. 8C) is now marked pseudo-delete because that was its state at the time that the index page split occurred at LRSN 1143.

At this stage, all log records (e.g., sorted log records 600) for page 15 have been processed. Since the full page 15 was re-written by a page split log record (at LSRN 1143), and the split occurred while there could have been uncommitted URIDs (e.g., URID 1010 and URID 1040), recovery process 158 (method 200 at 263) examines the page to see if it contains index entries for uncommitted inserts or deletes (recorded in step 2a). In this case, page 15 contains ABC2/12302, which was deleted by an uncommitted URID (e.g., URID 1040 at LSRN 1141) before the page was split. To remove the effect of the delete by the uncommitted URID (e.g., URID 1040), recovery process 158/(method 200 at 263ab) removes the pseudo delete indicator "pd" marking the RID 12302 in page 15.

Page 15 contents after removing the pseudo delete indicator "pd" are shown, for example, in FIG. 8D. Index page 15 (as shown in 8D) is now consistent, in that it references only RIDs (i.e., 12301, 12302, and 12303) that were committed by recovery point LSRN 1147.

The foregoing aspects of the disclosure herein relate to developing a consistent database index to a recovery point from a backup copy, for example, in the context of database failure and subsequent database recovery.

Another aspect of the disclosure herein relates to database indexes in the context of database migration. Physical data migration is an inexpensive way to migrate data from a source to a target database. Often the source for the data is a transaction consistent, point-in-time copy of the source data. However, it is difficult to get a consistent copy of the related indexes (i.e., the indexes for the source databases) at the same point-in-time, so the indexes (e.g., for the target database) must be rebuilt after the data is migrated. However, traditional index rebuilds are expensive and time consuming.

The systems and methods described herein allow creation of a transaction consistent copy of a database index at a specified point-in-time, in accordance with the principles of the present disclosure. The transaction consistent copy of the index is consistent with the data that is referenced by the index. By creating index copies that are consistent with the data (e.g., in the source databases) that is referenced by the index, a physical migration of both data and indexes (e.g., from the source database to a target database) is possible, thus eliminating the need for the expensive and time consuming index builds that are traditionally required.

Figure 9:
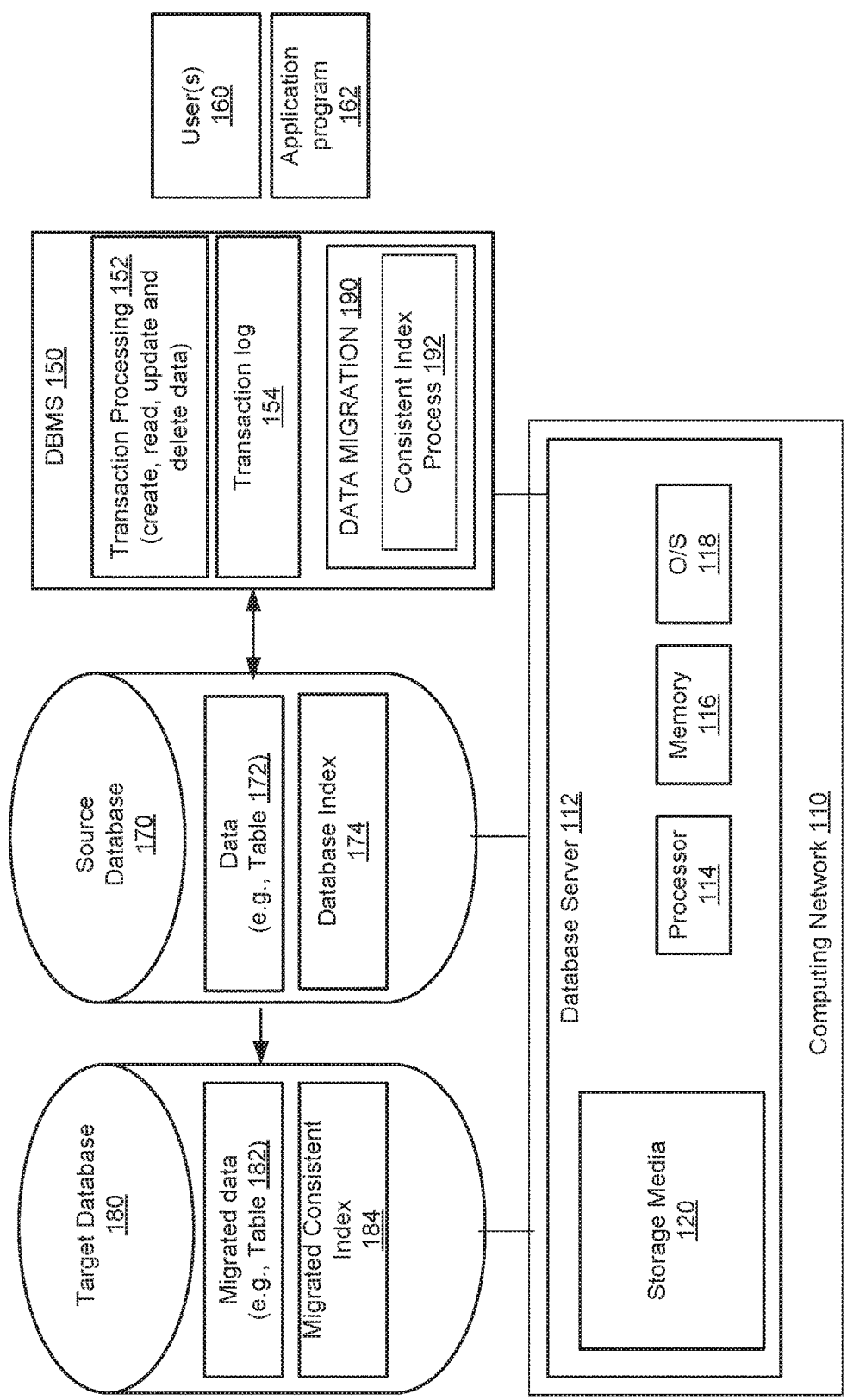
FIG. 9 is a schematic block diagram illustration of an example database environment, in accordance with the principles of the present disclosure.

FIG. 9 is a schematic block diagram illustration of an example database environment 900 in which the described systems and methods can be used to make a consistent copy of a database index at a point-in-time, in accordance with the principles of the present disclosure.

Example database environment 900 may, for example, include one or more databases (e.g., source database 170, target database 180, etc.) Like database environment 100, database environment 900 may include a database management system (e.g., DBMS 150) hosted on one or more physical or virtual computers (e.g., 110. computing network 110) including storage media (e.g., storage media 120)

In example implementations, source database 170 may include any data (e.g., table 172). Database 170 may contain both actual (or operational) data and metadata (data about data or description about data). In the example shown in FIG. 9, database 170 includes table 172 and also includes a database index (e.g., index 174) of table 172.

Like in database environment 100, users or administrators (e.g., user 160, application program 162, etc.) may use queries or programs (e.g., on conventional or online workstations or terminals) to access database 170 via DBMS 150. Each query or program may contain statements that request DBMS 150 to perform operations or transactions involving data (i.e., records in table 172) in database 170. The operations or transactions may, for example, include retrieving, updating, inserting, or deleting data, etc.

As in database environment 100, in database environment 900, DBMS 150 may include a module (e.g., transactions processing module 152) with functions to carry out the requested operations or transactions (e.g., create, read, update and delete) on the records in table 132. Further, DBMS 150 may maintain a transaction log (e.g., transaction log 154) of log records of the requested operations or transactions in a time sequence. An operation or transaction may be identified in transaction log 154 by its LRSN.

DBMS 150 may further include a data migration module (e.g., data migration 190) which includes processes for making a copy of database 130, for example, for data backup, migration, or replication. Data migration 190 may, for example, processes for identifying data (e.g., table 172) in source database 180 at a point-in-time for migration, and migrating such data (e.g., table 182) to a target database (e.g., target database 180). Data migration 190 may also include processes (e.g., consistent index process 192) for generating a consistent index (migrated consistent index 184) for the migrated data (e.g., table 182) at the point-in-time for migration.

Like index recovery process 158/method 200 for recovery of an index, consistent index process 192 for making a consistent index copy suitable for migration starts with a copy of an index (e.g., database index 174) of the source database (e.g., source database 170). The copy may contain uncommitted updates, and may not include updates that have not been externalized from the database buffers (of the source database) before the copy was made. When the copy is made, the copy process records a log point, that precedes any updates that might not have been included in the copy. The log point may be expressed as a relative byte address (RBA) or log record sequence number (LRSN).

FIG. 10 shows an example method 1000, which may be used by consistent index process 192 for making a consistent index copy at a specified point-in-time (consistency point or migration time), in accordance with the principles of the present disclosure.

Method 1000 includes obtaining an index copy at a log point that precedes the start of any database transactions that are not committed in the database at the recovery point (1011), and finding transaction log records (e.g., transaction log 154) describing transactions from the log point of the index copy to the recovery point including transactions that were uncommitted at the recovery point, and storing a unique identifier (URID) for each transaction (1020). Each transaction (e.g., in DB2 for z/OS) may be identified by a unit of recovery id (URID).

Method 1000 further includes, for each log record for the index that is part of an uncommitted transaction (identified at 1011): when the log record either inserts a new RID into the index, or deletes an existing RID from the index, extracting the key and row id (RID) from the log record (1030), and storing the extracted key and row id (RID) for later use (1040) (e.g., to later reverse the effects of the uncommitted transactions).

The extracted key and row id (RID) may be used later to restore the key/RID pair to the last committed state. Since only the first uncommitted log record for a key/RID pair is required in order to be able to restore the key to the last committed state, storing only the first uncommitted update to a key/RID pair may be adequate.

Method 1000 further includes sorting the log records (from the log point to the specified consistency point) into page order, and, if there are multiple log records for a page, sorting the log records for the page in ascending log record sequence (LRSN) order (1050).

Method 1000 (like method 200) then involves sequentially processing pages in an image copy of the index to create a consistent index (1060).

Sequentially processing pages in an image copy (e.g., a backup copy) of the index to create a consistent index 1060 includes reading a page of the index from the image copy into memory if it exists (1061) and applying the sorted log records to the index page in memory (1062).

If a log record is for an uncommitted key/RID insert, applying the sorted log records to the index page in memory 1062 includes inserting the key/RID in the index page (because, in the case of a non-unique index, other transactions may add RIDs to the RID list for the key), and then marking the inserted RID as being a deleted RID by setting a pseudo-delete indicator associated with the RID (1062*a*).

Conversely, if a log record is for an uncommitted delete of a RID, or an insert of an additional RID to an existing key, in a first implementation of method 1000, applying the sorted log records to the index page 1062 may bypass application of the log record (for the uncommitted delete, or for the insert of an additional RID to an existing key) to the index page (1062*b*). In a second implementation of method 200, applying the sorted log records to the index page 1062 includes applying the log record to the index page by setting the pseudo-delete indicator for the RID that is deleted, or adding the RID that is inserted. After the log record is applied, the pseudo-delete indicator can be removed to reverse the effect of the uncommitted delete, or can be set to reverse the effect of the uncommitted insert to achieve the same effect as the first implementation of method 1000 (i.e., keeping the uncommitted delete RID, or not adding the RID from the uncommitted insert).

Applying the sorted log records to the index page 1062 includes applying other log records (other than the uncommitted key/RID insert, uncommitted RID delete, and uncommitted RID insert to existing key log records) normally to the index page (1062*c*).

After all log records have been applied to the index page at 1062, method 1000 includes, if the index page was updated by a log record that re-introduces index data from an uncommitted transaction (i.e., page split, garbage collection, etc.) and if the log point of that log record is in the range of the log containing uncommitted transactions for the index, post processing the index page (1063).

In method 1000, post processing the index page 1063 includes determining if any uncommitted index updates were re-introduced by a log record that re-writes the page (such as a page split, or garbage collection) by comparing each key/RID pair entry in the index page with the key/RID data that was previously stored (e.g., at 1040), and if any of the index entries were affected by uncommitted log records, reversing the effect of the uncommitted updates using the key/RID data that was previously stored (e.g., at 1040) (1063*a*).

Further, reversing the effect of the uncommitted updates using the key/RID data that was previously stored 1063*a* includes, if the first uncommitted update to a key/RID pair was an insert with the RID marked as being uncommitted, setting the pseudo-delete indicator to delete to restore the last committed state for the key (1063*aa*), and, if the first uncommitted update to a key/RID pair was a delete, removing the pseudo-delete indicator marking the RID as being deleted to reverse the effect of the delete and to get the last committed state for that key (1063*ab*).

Method 1000 further includes writing the updated index page to the index copy (1064). At this stage of method 1000, index page is now consistent with the data as of the specified consistency point, so it can be externalized by writing it to a copy dataset (e.g., as migrated consistent index 184).

Implementations of the various techniques described herein may be implemented in digital electronic circuitry, or in computer hardware, firmware, software, or in combinations of them. Implementations may be implemented as a computer program product, i.e., a computer program tangibly embodied in a non-transitory information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method to recover a consistent database index to reference, at a recovery point-in-time, data records that are contained in a database recovered from a backup copy or a migration copy of the database, the data records identified by a record identifier (RID) and the index including one or more index pages with (key/RID) pair entries, the method comprising:

obtaining an index copy at a log point-in-time that precedes database transactions on the database that were uncommitted at the recovery point;

finding transaction log records describing transactions from the log point to the recovery point including both log records describing transactions that were committed and log records describing transactions that were uncommitted at the recovery point;

sorting the log records in an index page order and an ascending log record sequence number (LRSN) order;

applying, in sorted page order and LRSN order, the updates reflected in the sorted log records to the pages of the index copy in a single pass operation on the index copy, wherein applying the updates reflected in the sorted log records to the pages of the index copy includes marking the RID from each key/RID entry caused by an uncommitted insert as a deleted RID; and after or during the single pass operation, restoring each key/RID entry that is a result of an uncommitted transaction to its last committed state by deleting the RIDs that were added by an uncommitted insert and un-deleting each RID entry caused by an uncommitted delete, whereby each key/RID entry in the index is restored to a state that is consistent with the database in that only updates that were committed at the recovery point are reflected in the recovered index.

2. The method of claim 1, wherein finding transaction log records describing transactions from the log point to the recovery point includes:

when a log record that is part of an uncommitted transaction either inserts a key/RID pair into the index, adds a RID to an existing key, or deletes a RID from the index, extracting the key/RID pair from the log record; and storing the extracted key/RID pair for the uncommitted transaction.

3. The method of claim 2, wherein restoring each key/RID entry that is updated by an uncommitted transaction to a last committed RID for the key by referencing the stored extracted key/RID pair.

4. The method of claim 1, wherein, if a log record is for an uncommitted key/RID insert, applying the log record to the index page includes inserting the key/RID in the index page and marking the inserted RID with a pseudo-delete indicator to delete the RID entry.

5. The method of claim 1, wherein, if a log record is for an uncommitted insert of an additional RID to an existing key, applying the log record to the index page includes marking the inserted RID with a pseudo-delete indicator to delete the RID entry.

6. The method of claim 1, wherein, if a log record is for an uncommitted delete of a RID, applying the log record to the index page includes setting a pseudo-delete indicator in the RID pointer to un-delete.

7. The method of claim 1, wherein, if a log record is for an uncommitted RID delete or RID insert, applying the log record to the index page includes bypassing deleting the RID entry or inserting the RID entry for the key in the index page.

8. The method of claim 1, further comprising, after applying the transactions of the sorted log records to the pages of the index copy in the single pass operation, if an index page was updated by a log record that could re-introduce data from an uncommitted transaction and if the LRSN of that log record is in the range of LRSN containing uncommitted transactions for the index, post processing the index page to:

examine key/RID pairs on the index page to determine if any of the index entries were affected by uncommitted log records, and reversing the effect of the uncommitted updates using the key/RID data that was previously extracted from the uncommitted log records.

9. The method of claim 8, wherein reversing the effect of the uncommitted updates includes:

if the first update to a key/RID pair by an uncommitted transaction was a RID insert, deleting the RID to restore the last committed state for the RID; and, if the first update to a key/RID pair by an uncommitted transaction was a RID delete, removing the pseudo-delete indicator marking the RID as being deleted to reverse the effect of the delete to get the last committed state for that RID.

10. The method of claim 8, wherein reversing the effect of the uncommitted updates includes: writing the updated index page to an index that is consistent to the recovery point.

11. A computer system to recover a consistent database index to reference, at a recovery point-in-time, data records that are contained in a database recovered from a backup copy or data records that are contained in a migration copy of the database, each data record being identified by a record identifier (RID) and the database index including one or more index pages with (key/RID) pair entries, the computer system comprising:

a database management system (DBMS) coupled to the database and maintaining a log of transactions involving data records in the database, the DBMS hosted on a computer network including at least one processor and at least one memory; and an index recovery module configured to:

obtain an index copy at a log point-in-time that precedes database transactions on the database that were uncommitted at the recovery point;

find transaction log records describing transactions from the log point to the recovery point including both log records describing transactions that were committed and log records describing transactions that were uncommitted at the recovery point;

sort the log records in an index page order and an ascending log record sequence number (LRSN) order;

apply, in sorted page order and LRSN order, the updates reflected in the sorted log records to the pages of the index copy in a single pass operation on the index copy, wherein applying the updates reflected in the sorted log records to the pages of the index copy includes marking the RIDs from each key/RID entry caused by an uncommitted insert as a deleted RID; and after or during the single pass operation, restore each key/RID entry that is a result of an uncommitted transaction to its last committed state by deleting the RIDs that were added by an uncommitted insert and un-deleting each RID entry caused by an uncommitted delete to obtain the consistent database index at the recovery point.

12. The computer system of claim 11, wherein the index recovery module finds transaction log records describing transactions from the log point to the recovery point by:

when a log record that is part of an uncommitted transaction either inserts a key/RID pair into the index, adds a RID to an existing key, or deletes a key/RID pair from the index, extracting the key/RID pair from the log record; and storing the extracted key/RID pair for the uncommitted transaction.

13. The computer system of claim 12, wherein the index recovery module restores each key/RID entry that is updated by an uncommitted transaction to a last committed RID for the key by determining the last committed RID for the key with reference to the stored extracted key/RID pair.

14. The computer system of claim 11, wherein the index recovery module, if a log record is for an uncommitted key/RID insert, applies the log record to the index page by inserting the key/RID in the index page and marking the inserted RID with a pseudo-delete indicator to delete the RID entry.

15. The computer system of claim 11, wherein the index recovery module, if a log record is for an uncommitted insert of an additional RID to an existing key, applies the log record to the index page by marking the inserted RID with a pseudo-delete indicator to delete the RID entry.

16. The computer system of claim 11, wherein the index recovery module, if a log record is for an uncommitted delete of a RID, applies the log record to the index page by setting a pseudo-delete indicator in the RID pointer to un-delete.

17. The computer system of claim 11, wherein the index recovery module, if a log record is for an uncommitted RID delete or RID insert, bypasses deleting the RID entry or inserting the RID entry for the key in the index page.

18. The computer system of claim 11, wherein the index recovery module, after applying the transactions of the sorted log records to the pages of the index copy in the single pass operation, if an index page was updated by a log record that re-introduced data from an uncommitted transaction and if the LRSN of that log record is in the range of LRSN containing uncommitted transactions for the index, post processes the index page to:

examine key/RID pairs on the index page to determine if any of the index entries were affected by uncommitted log records, and reversing the effect of the uncommitted updates using the key/RID data that was previously extracted from the uncommitted log records.

19. The computer system of claim 18, wherein reversing the effect of the uncommitted updates includes:

if the first update to a key/RID pair by an uncommitted transaction was a RID insert, deleting the RID to restore the last committed state for the RID; and, if the first update to a key/RID pair by an uncommitted transaction was a RID delete, removing the pseudo-delete indicator marking the RID as being deleted to reverse the effect of the delete to get the last committed state for that key.

20. The computer system of claim 18, wherein reversing the effect of the uncommitted updates includes: writing the updated index page to an index that is consistent to the recovery point.

21. A computer program product including instructions recorded on a non-transitory computer-readable storage medium and configured to cause at least one processor to recover a consistent database index to reference, at a recovery point-in-time, data records that are contained in a database recovered from a backup copy or data records that are contained in a migration copy of the database, each data record being identified by a record identifier (RID) and the database index including one or more index pages with (key/RID) pair entries, the instructions including instructions that when executed by the at least one processor cause the at least one processor to:

obtain an index copy at a log point-in-time that precedes database transactions on the database that were uncommitted at the recovery point;

find transaction log records describing transactions from the log point to the recovery point including both log records describing transactions that were committed and log records describing transactions that were uncommitted at the recovery point;

sort the log records in an index page order and an ascending log record sequence number (LRSN) order;

apply, in sorted page order and LRSN order, the updates reflected in the sorted log records to the pages of the index copy in a single pass operation on the index copy, wherein applying the updates reflected in the sorted log records to the pages of the index copy includes marking the RID from each key/RID entry caused by an uncommitted insert as a deleted RID; and after or during the single pass operation, restore each key/RID entry that is a result of an uncommitted transaction to its last committed state by deleting the RIDs that were added by an uncommitted insert and un-deleting each RID entry caused by an uncommitted delete to obtain the consistent database index at the recovery point.

22. The computer program product of claim 21, wherein the instructions include instructions that, when executed, cause the at least one processor to find transaction log records describing transactions from the log point to the recovery point by:

when a log record that is part of an uncommitted transaction either inserts a key/RID pair into the index, adds a RID to an existing key, or deletes a key/RID pair from the index, extracting the key/RID pair from the log record; and storing the extracted key/RID pair for the uncommitted transaction.

23. The computer program product of claim 22, wherein the instructions include instructions that, when executed, cause the at least one processor to:

restore each key/RID entry that is updated by an uncommitted transaction to a last committed RID for the key by determining the last committed RID for the key with reference to the stored extracted key/RID pair.

24. The computer program product of claim 21, wherein the instructions include instructions that, when executed, cause the at least one processor to:

if a log record is for an uncommitted key/RID insert, apply the log record to the index page by inserting the key/RID in the index page and mark the inserted RID with a pseudo-delete indicator to delete the RID entry.

25. The computer program product of claim 21, wherein the instructions include instructions that, when executed, cause the at least one processor to:
if a log record is for an uncommitted insert of an additional RID to an existing key, apply the log record to the index page by marking the inserted RID with a pseudo-delete indicator to delete the RID entry.

26. The computer program product of claim 21, wherein the instructions include instructions that, when executed, cause the at least one processor to:
if a log record is for an uncommitted delete of a RID, apply the log record to the index page by setting a pseudo-delete indicator setting in the RID pointer to un-delete.

27. The computer program product of claim 21, wherein the instructions include instructions that, when executed, cause the at least one processor to:
if a log record is for an uncommitted RID delete or RID insert, bypass deleting the RID entry or inserting the RID entry for the key in the index page.

28. The computer program product of claim 21, wherein the instructions include instructions that, when executed, cause the at least one processor to:
after applying the transactions of the sorted log records to the pages of the index copy in the single pass operation, if an index page was updated by a log record that re-introduced data from an uncommitted transaction and if the LRSN of that log record is in the range of LRSN containing uncommitted transactions for the index, post process the index page to:
examine key/RID pairs on the index page to determine if any of the index entries were affected by uncommitted log records, and reverse the effect of the uncommitted updates using the key/RID data that was previously extracted from the uncommitted log records.

29. The computer program product of claim 28, wherein the instructions include instructions that, when executed, cause the at least one processor to reverse the effect of the uncommitted updates by:
if the first update to a key/RID pair by an uncommitted transaction was a RID insert, deleting the RID to restore the last committed state for the key; and,
if the first update to a key/RID pair was a RID delete by an uncommitted transaction, removing the pseudo-delete indicator marking the RID as being deleted to reverse the effect of the delete and to get the last committed state for that RID.

30. The computer program product of claim 28, wherein the instructions include instructions that, when executed, cause the at least one processor to further write the updated index page to an index that is consistent to the recovery point.

* * * * *